April 22, 1952     C. H. HESS     2,593,755

HYGROMETER

Filed Aug. 20, 1948

Clem H. Hess
INVENTOR.

BY Clarence A. O'Brien
and Harvey B. Jacobson
Attorneys

Patented Apr. 22, 1952

2,593,755

UNITED STATES PATENT OFFICE 2,593,755

HYGROMETER

Clem H. Hess, Conway, Ark., assignor of fifty per cent to Rolland A. Bradley, Conway, Ark.

Application August 20, 1948, Serial No. 45,299

2 Claims. (Cl. 73—337)

This invention relates to a novel hygrometer responsive to the changing moisture content of the atmosphere for use in indicating local fishing probabilities.

It is well known in the fishing art that in any given locality there is a correlation between local barometric pressure and fishing, the fishing being good when the barometer is high or rising, and poor when the barometer is low or falling. The primary object of this invention, therefore, is to provide a device which responds solely to the amount of moisture in the atmosphere and the changing atmospheric moisture content.

Yet another object of this invention is to provide a device for indicating fishing probabilities several hours before the fisherman becomes aware of any change through ordinary human perception.

Yet another object of this invention is to provide a hygrometer which is not especially sensitive to minor changes in atmospheric conditions, since such sensitivity would be undesirable in a device employed primarily for indicating fishing probabilities. The device of the instant invention, therefore, is designed to prevent any small, insignificant change in atmospheric conditions from registering on the indicator per se. It is well known in the art of fishing that relatively small changes in barometric conditions at either extreme of the barometer have very little, if any, effect on fishing probabilities. And further, when any large change does occur, the reaction on fishing is not sudden and instantaneous but is a gradual process, lasting sometimes from twenty-four to forty-eight hours.

An object of the instant invention, therefore, is to provide a hygrometer in which the indicator is limited in its horizontal rotary movement to approximately 200°.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Figure 1:
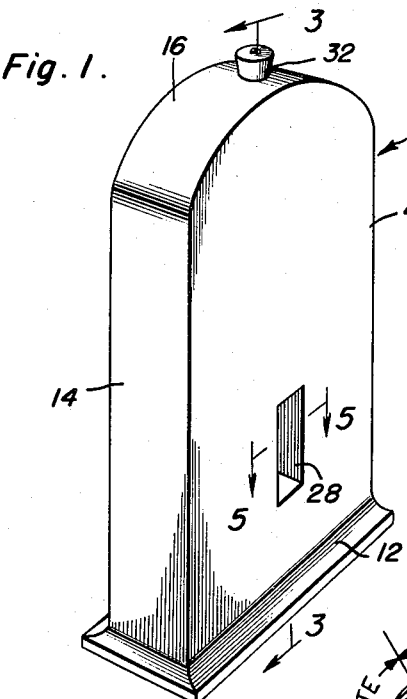
Figure 1 is a frontal perspective view of the device of the instant invention.
Figure 2:
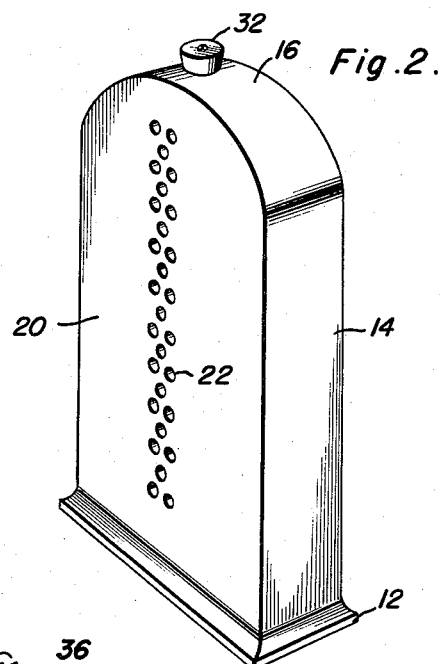
Figure 2 is a rear perspective view of the device.
Figure 3:
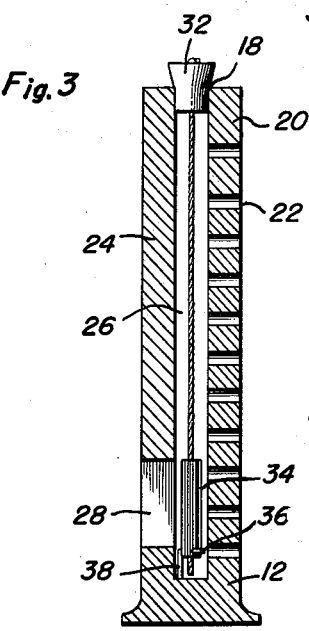
Figure 3 is a longitudinal sectional view taken substantially on the plane of section line 3—3 of Figure 1.
Figure 6:
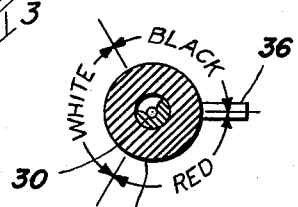
Figure 6 is an enlarged transverse sectional view through the indicator.
Figure 5:
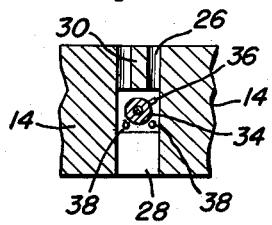
Figure 5 is a transverse sectional view taken substantially on the plane of section line 5—5 of Figure 1.

Generally indicated at 10 is a casing which may be of any desired shape and form, and which consists of a base member 12, side members 14, a top, preferably arcuated member 16, having a central aperture 18 therein, a back member 20 provided with longitudinally spaced openings or apertures 22, and a front member 24 spaced from the back member 22 to provide a longitudinally extending slot 26 therebetween. The bottom of the front member 24 is additionally provided with a cutout or window portion 28.

Figure 4:
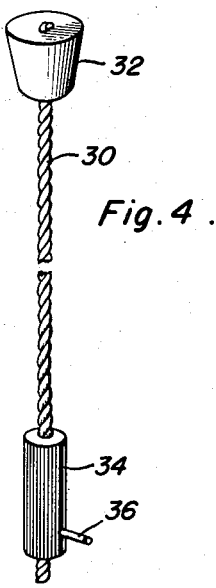
Figure 4 is a perspective view of the hygroscopic element associated indicator removed from the casing.

As shown more clearly in Figure 4, the hygroscopic element and associated indicator consists essentially of a twisted, moisture-responsive element, such as catgut 30, to the top of which is secured a tapered cork 32. To the bottom of the catgut 30 is attached an indicator 34, which is preferably cylindrical in shape and which is preferably provided with sections of colors, such as white, red, and black, indicating whether fishing is good, fair, or bad. The cylindrical indicator 34 carries at its bottom end a projection 36.

The hygroscopic element 30 is longitudinally suspended in the casing and extends through the slot 26 between the front member 24 and back member 22. It is suspended from the top member 16, since the aperture 18 thereof engageably receives the tapered cork 32, as shown clearly in the drawings.

Secured to the base member 12 is a pair of spaced stops or retarding pins 38 which extend into the slot 26 and selectively engage the projection 36 to limit the horizontal rotary movement of the cylindrical indicator 34. The stops 38 are spaced preferably in such a manner as to limit the rotation of the cylindrical indicator to 200°.

In practical operation, when the atmosphere is relatively moist, the catgut will tend to untwist and the cylindrical indicator 34 will display before the window portion 28 one of the colored sections indicating whether fishing is good or fair. As the atmosphere dries, the catgut will tend to twist back into a tighter position, and the cylindrical indicator 34 will display before the window portion 28 a colored section indicating whether the fishing probabilities are fair or bad.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A hygrometer for indicating fishing probabilities comprising a casing including a base member, an apertured top member, a back member having longitudinally spaced openings, and a front member having a window portion at the bottom thereof, a twisted catgut longitudinally disposed in said casing between said back and front members, means for suspending said catgut from the aperture provided in said top member, a multi-colored cylindrical indicator secured at the bottom of said catgut and disposed in front of said window portion, a projection adjacent the lower end of said indicator, and a pair of spaced stops carried by said base member selectively engaging said projection for limiting the horizontal rotary movement of said indicator.

2. The combination of claim 1 wherein said stops are spaced to limit the rotary movement of said indicator to 200°.

CLEM H. HESS.

REFERENCES CITED

The following references are of record in the file of this patent:

UNITED STATES PATENTS

| Number | Name | Date |
|---|---|---|
| 20,326 | Clarke | May 25, 1858 |
| 801,074 | Gerrer | Oct. 3, 1905 |
| 1,633,322 | Gregory | June 21, 1927 |
| 2,088,326 | Klopfer | July 27, 1937 |

FOREIGN PATENTS

| Number | Country | Date |
|---|---|---|
| 280,336 | Germany | Nov. 12, 1914 |